United States Patent
Choi (10) Patent No.: US 7,885,002 B2
(45) Date of Patent: Feb. 8, 2011

(54) FLOOR PROJECTION SCREEN AND METHOD FOR MANUFACTURING THE SAME

(76) Inventor: Hae-Yong Choi, Mookdong I Park Apartment #108-301, 385 Mook-dong, Jungryang-gu, Seoul-city (KR) 131-768

( * ) Notice: Subject to any disclaimer, the term of this patent is extended or adjusted under 35 U.S.C. 154(b) by 343 days.

(21) Appl. No.: 12/153,199

(22) Filed: May 15, 2008

(65) Prior Publication Data
US 2008/0291537 A1 Nov. 27, 2008

(30) Foreign Application Priority Data
May 22, 2007 (KR) ........................ 10-2007-0051200

(51) Int. Cl.
*G03B 21/56* (2006.01)
(52) U.S. Cl. .................... 359/443; 359/452; 52/173.1
(58) Field of Classification Search ................. 359/443, 359/452–453; 52/27, 38, 173.1
See application file for complete search history.

(56) References Cited
U.S. PATENT DOCUMENTS

| | | | | |
|---|---|---|---|---|
| 3,454,687 A * | 7/1969 | Ciofani | ........................ | 264/1.6 |
| 4,424,239 A * | 1/1984 | Nota et al. | ................ | 427/388.3 |
| 4,682,853 A * | 7/1987 | Broer et al. | .................. | 359/453 |
| 5,575,294 A * | 11/1996 | Perry et al. | .................. | 600/587 |
| 6,630,948 B1 * | 10/2003 | Walker | ........................ | 348/168 |
| 6,982,649 B2 * | 1/2006 | Blum et al. | .............. | 340/815.4 |
| 7,068,427 B2 * | 6/2006 | Hopkins et al. | ............. | 359/443 |

\* cited by examiner

*Primary Examiner*—Christopher Mahoney
(74) *Attorney, Agent, or Firm*—Bacon & Thomas, PLLC (57) ABSTRACT

A floor projection screen to be installed in front of department stores, shops, shopping malls, and a method for manufacturing the same are disclosed. The floor projection screen is formed by overlapping a hard screen material, which is obtained by mixing white cement with a light diffuser such as glass beads, silica, etc. having a particle of 400 to 800 mesh, or by mixing plastic resin with white cement, calcium material, pigments, etc., and a soft material such as urethane, rubber, or non-woven fabrics, thereby achieving vivid imaging, an anti-skid function, and durability for friction. The floor projection screen is manufactured by stacking a screen material on a surface of a tape-shaped soft material and rolling and hardening the screen material to complete a screen having a centric ring pattern, or by stacking a screen material on a surface of a tape-shaped soft material, repeating the stacking step until a desired size of the screen is obtained, and hardening the resulting stack to achieve a screen surface having a particle size of 40 to 800 mesh.

5 Claims, 9 Drawing Sheets

FLOOR PROJECTION SCREEN AND METHOD FOR MANUFACTURING THE SAME

BACKGROUND OF THE INVENTION

1. Field of the Invention

The present invention relates to a visual advertising apparatus using a projector, and more particularly, to a floor screen, which is installed in a footpath or passageway floor and can achieve vivid imaging, excellent friction-resistant and wear-resistant surface characteristics, and an anti-skid function for pedestrian safety.

2. Description of the Related Art

Department stores, fast-food restaurants, and convenience stores have many visitors.

Most people usually focus their gaze on the ground while walking.

Accordingly, it is efficient to display advertising, etc. on the floor of an entrance and exit in order to attract customers, and this also is advantageous to achieve maximum advertising effects.

Figure 1:
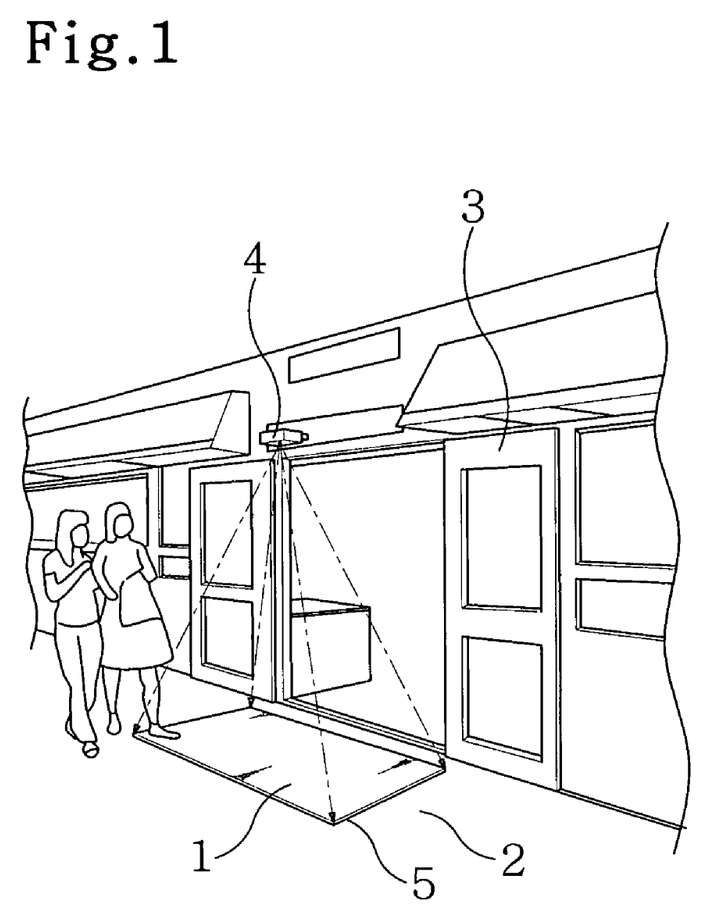
FIG. 1 is an explanatory view illustrating the use example of the present invention.

As one method to efficiently display advertising images or moving images on the floor of passageways, etc., as shown in FIG. 1, it is proposed in the present invention that a projector 4 be installed at the ceiling, and a screen 1 be installed on the passageway floor.

However, using a conventional screen as a floor screen has the following problems. The surface of the screen suffers considerable damage as pedestrians walk thereupon. However, when applying a surface intensifier or taking other measures to reinforce the hardness of the screen surface, the screen surface may become opalescent. Such an opalescent surface cannot achieve efficient light diffusion required to reproduce an image, causing an unclear image and resulting in a hot-spot phenomenon wherein light from a projector is completely reflected.

In particular, when the opalescent surface is contaminated with moisture or impurities, there is a risk of pedestrians slipping, thereby suffering injury. Further, since the screen surface must be frequently scraped for cleaning and is easily damaged by frictional contact with shoe soles of pedestrians, permanent scratches may remain on the screen surface.

For these reasons, the floor screen must have an anti-skid configuration for preventing the slip and falls of pedestrians while assuring reproduction of vivid images and other screen characteristics.

SUMMARY OF THE INVENTION

Therefore, the present invention has been made in view of the above problems, and it is an object of the present invention to provide a floor projection screen, which can maintain a desired screen surface strength required to maintain a normal surface state even if a screen surface is damaged by friction due to frequent pedestrian passage or is scraped and worn through repeated cleaning while achieving an anti-skid function, and a method for manufacturing the floor projection screen.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention has a feature in that a screen 1 is manufactured by appropriately mixing two components, i.e. a screen material 1a and a soft material 1b, with each other.

Another feature of the present invention is that the screen 1 can maintain not only a uniform overall strength sufficient to continuously maintain a screen surface strength even if a screen surface is worn, but also a basic color of white.

For this, in one example, the screen material 1a may be formed of white cement.

The white cement is composed of lime and white clay having low iron content, and thus, is relatively easily mixed with various pigments. Also, the white cement has characteristics of being easily hardened and maintaining a high strength once hardened.

A reflective pigment, selected from aluminum powder and glass-beads, can be mixed independently with the white cement, or a mixture obtained by mixing the aluminum powder and glass-beads in an appropriate mixing ratio can be mixed with the white cement. With the mixing of the reflective pigment, the resulting white cement can achieve excellent reflectivity and construct a strong and hard surface of the screen 1 once hardened.

Also, a light diffuser, such as glass-beads, silica or titanium, can be mixed with the white cement. In this case, when the white cement, which is mixed with the light diffuser, is hardened, the resulting white cement can achieve excellent diffusibility and construct a strong and hard surface of the screen 1.

In another example, the screen material 1a may be formed of plastic resin such as homaica or epoxy resin. Such a plastic resin is easily hardened, is easily mixed with plaster, calcium and white stone powder and other white pigments, and can achieve a high strength once hardened.

Any one selected from white pigments, aluminum powder, glass-beads, titanium, white cement, etc., or mixtures thereof can be mixed independently with the plastic resin, and the resulting plastic resin can construct a strong and hard surface of the screen 1 once hardened.

The above-described screen material 1a has a uniformly high overall strength, and allows a surface of the constructed screen 1 to maintain a high strength regardless of the number of pedestrians who walk on the screen 1. Also, owing to a high reflectivity white material such as white pigments, aluminum powder, glass-beads, or the like, which is uniformly mixed in the overall screen material 1a, the screen material 1a can advantageously maintain an original surface state thereof even if the screen material 1a is subjected to surface wear.

However, with the use of the high strength screen material 1a, the screen 1 has drawbacks in that it causes pedestrians to slip on the screen 1 when moisture or impurities are present on the screen 1, and that it is easily cracked by temperature variation.

To compensate for the above-described drawbacks, the present invention adopts the soft material 1b to be embedded in the screen material 1a. In the present invention, the soft material 1b is added into the surface of the screen 1 such that it forms series of concentric rings with an appropriate interval, to provide the screen 1 with an anti-skid function and to prevent cracks of the screen 1 due to thermal expansion and contraction thereof.

The soft material 1b is selected from various soft and highly wear-resistant materials such as urethane, rubber, non-woven fabric, etc. The soft material 1b has ductility sufficient to achieve excellent adsorptive power, and thus, efficiently increases a frictional force with the pedestrian's shoe sole for restricting slippage thereof.

Accordingly, although densely distributing the soft material 1b into the screen material 1a by a narrow interval is efficient to achieve a great frictional force, such a dense distribution of the soft material 1 results in deterioration in the performance of the screen 1. Therefore, it is important to appropriately balance the performance of the screen 1 and the anti-skid function.

For example, average shoe sizes are in a range of 100 mm to 300 mm. Accordingly, assuming that the soft material 1b, in the form of a line having a width of at least 1 mm, is embedded into the screen material 1a at an interval of 20 mm, five or more lines of the soft material 1b are provided for a shoe size of 100 mm, providing an anti-skid function.

In this case, since the width of a unit section of the screen material 1a is 20 mm, and the width of each line of the soft material 1b is 1 mm, the screen material 1a occupies 95% of the total area of the screen 1, and the anti-skid area occupies only 5% of the screen 1. This distribution of the screen 1 can achieve the anti-skid function without deterioration in the performance of the screen 1.

To continuously maintain the lines of the soft material 1b even if the surface of the screen 1 is frictionally worn, the lines of the soft material 1b are embedded from the surface of the screen 1 down to half or more of the overall depth of the screen 1.

Hereinafter, preferred embodiments of the present invention using the above-described screen material 1a and soft material 1b will be described in detail with reference to the accompanying drawings.

Note that dimensions suggested in the following embodiments are intended to facilitate clear understanding, and the present invention is not limited thereto. Also, although the following embodiments illustrate different configurations of the screen, the corresponding constituent elements of the different configurations will be designated by the same reference numerals for convenience of description.

First Embodiment

Figure 2:
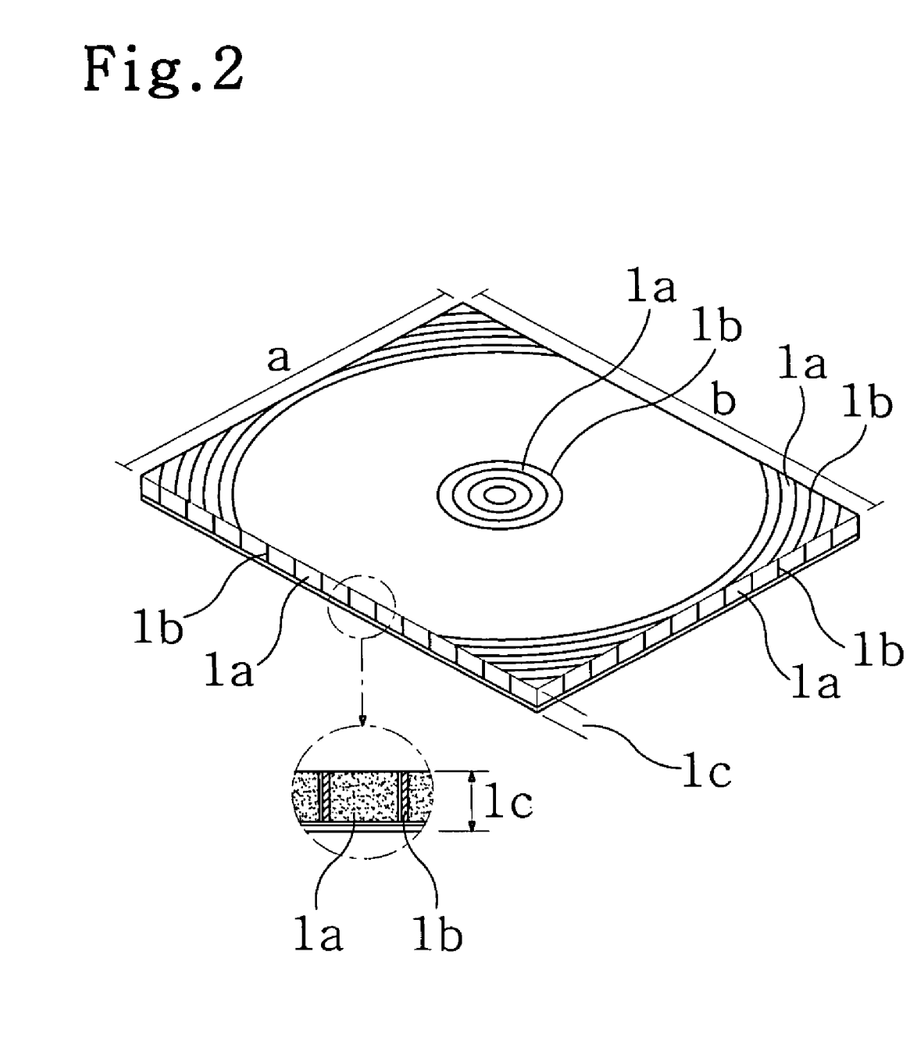
FIG. 2 is an explanatory view of a screen according to a first embodiment of the present invention, which has a concentric ring pattern.

FIG. 2 illustrates a screen 1, which has a length a of 60 mm, a width b of 800 mm, and a thickness 1c of 50 mm. The screen 1 comprises a light diffuser, such as glass-beads or titanium, which is uniformly mixed with white cement.

In the first embodiment of the above-described screen 1, the soft material 1b takes the form of a plurality of circular lines each having a width of 1 mm. The circular lines of the soft material 1b are arranged concentrically, with an interval of 20 mm, in a depth direction of the screen 1, and thus, a width of each unit section of the screen material 1a between the respective neighboring lines of the soft material 1b is 20 mm.

The screen material 1a has the same thickness as the thickness 1c of the screen 1, and thus, has a thickness of 50 mm. Similarly, the soft material 1b has a thickness of 50 mm.

Before the screen material 1a is worn to 50 mm, the soft material 1b can continuously maintain a uniform texture distribution in the surface of the screen 1. Also, a light diffuser is uniformly distributed in the screen material 1a. Even if the surface of the screen 1 is worn, the light diffuser also maintains a constant distribution in the surface of the screen 1. Besides, the screen material 1a is formed of white cement, and thus, can maintain a considerably strong screen form.

With the screen 1 of the present embodiment, the anti-skid soft material 1b has a concentric ring pattern representing no specific directionality, and exhibits more efficient anti-skid functionality. When the screen 1 is installed outdoors, even if the screen material 1a expands and contracts due to temperature variation, the soft material 1b can elastically absorb the expansion and contraction of the screen material 1a, preventing cracking.

Figure 7:
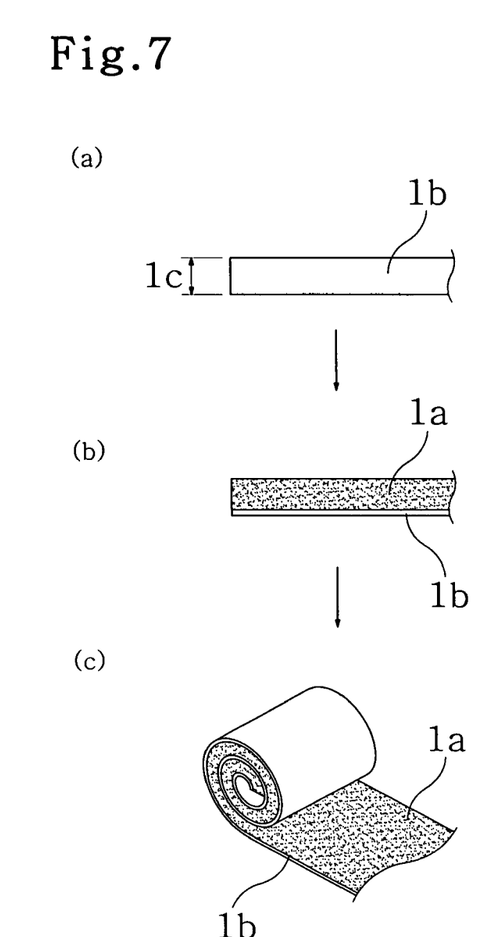
FIGS. 7A to 7C are explanatory views illustrating a method for manufacturing the screen of a concentric ring pattern shown in FIG. 2.

To manufacture the above-described screen 1, as shown in FIG. 7A, first, the soft material 1b is prepared into a tape having a width of 50 mm.

Then, as shown in FIG. 7B, white cement, pre-mixed with a light diffuser such as glass-beads, is poured onto a surface of the tape-shaped soft material 1b to a height of 20 mm. To assure uniform distribution of the white cement, preferably, the soft material 1b is first placed in the bottom of a mold, and then, the white cement is poured into the mold.

The soft material 1b, upon which the white cement is poured, is rolled until an optional size of the screen 1 is obtained, as shown in FIG. 7C. Then, after the white cement is sufficiently hardened, the resulting screen 1 is cut to a desired size.

With the above-described manufacturing method, the soft material 1b, which takes the form of circular lines arranged concentrically in a depth direction of the screen 1, can be easily accomplished.

Second Embodiment

Figure 3:
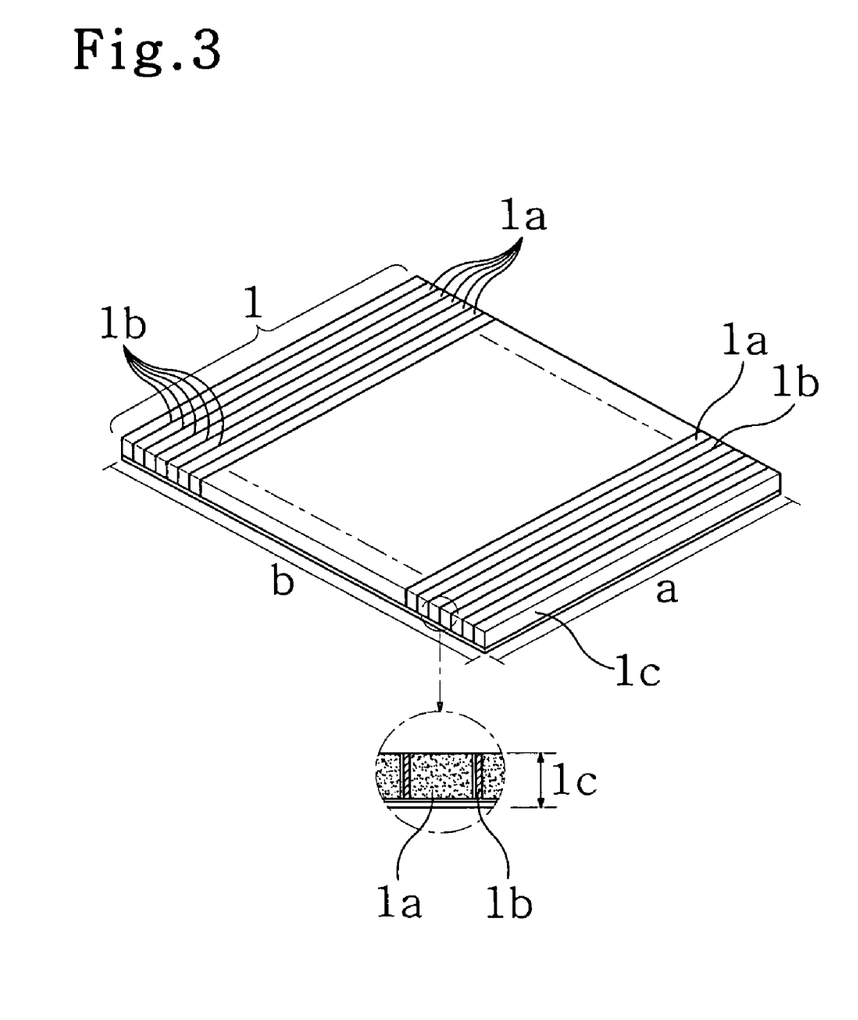
FIG. 3 is an explanatory view of a screen according to a second embodiment of the present invention, which has a vertical pattern.

FIG. 3 illustrates a screen 1, in which the soft material 1b takes the form of lines arranged in a vertical direction or horizontal direction. For convenience of description, dimensions of the screen 1 of the present embodiment are considered to be identical to those of the previously described first embodiment.

The operational effects of the present embodiment are also identical to those of the first embodiment.

Figure 8:
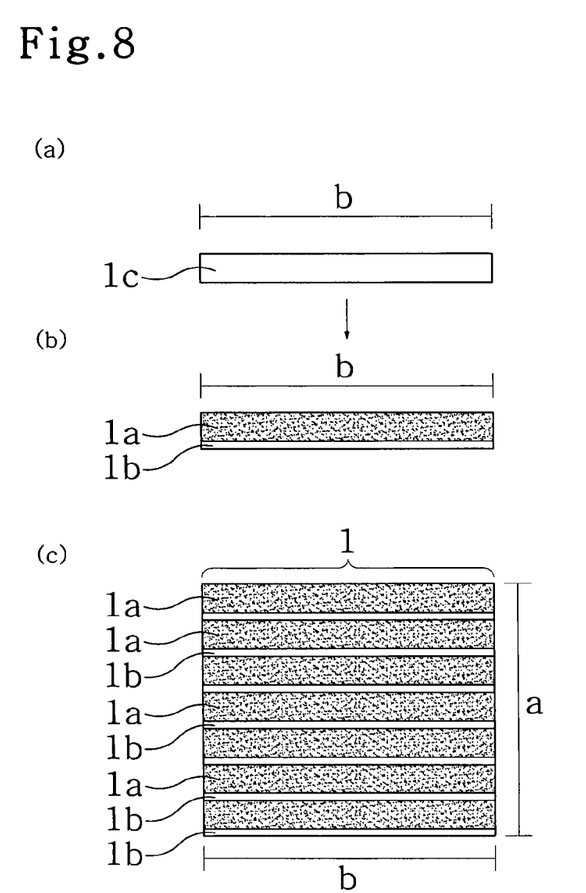
FIGS. 8A to 8C are explanatory views illustrating a method for manufacturing the screen of a vertical pattern shown in FIG. 3.

To manufacture the screen 1 of the present embodiment, first, as shown in FIG. 5A, the soft material 1b is prepared into a tape having a width of 50 mm. Then, white cement, pre-mixed with a light diffuser such as glass-beads, is poured onto a surface of the tape-shaped soft material 1b to a height of 20 mm.

The soft material 1b, upon which the white cement is poured, is cut to have the same width b as that of the screen 1.

Then, as shown in FIG. 8C, after the soft material 1b is repeatedly stacked to the length a of the screen 1, the resulting stack is hardened.

Of course, the length a and the width b of the screen 1 can be changed freely.

Third Embodiment

Figure 4:
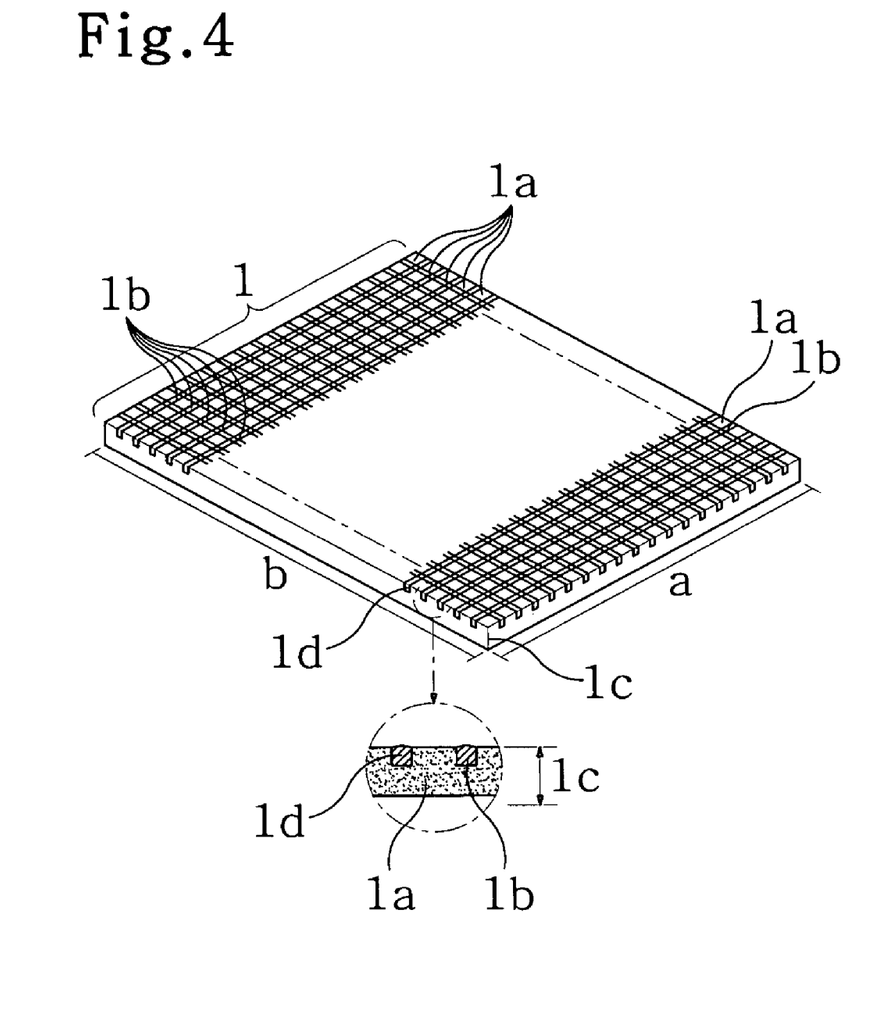
FIG. 4 is an explanatory view of a screen according to a third embodiment of the present invention, which has a lattice pattern.

FIG. 4 illustrates a screen 1, in which the soft material 1b takes the form of vertical and horizontal lines arranged in a lattice pattern. The soft material 1b can be embedded in a surface of the screen material 1a.

Specifically, a hard material of the screen 1 is prepared by appropriately mixing white pigments, glass-beads, silica, aluminum powder, or mixtures thereof, into an inorganic material such as clay, feldspar, silica stone, pottery stone, or the like. The prepared hard material is placed in a mold 6, to be molded into a block having vertical and horizontal grooves 1d. Then, the block is thermally hardened, and the soft material 1b is inserted into the grooves 1d.

Figure 9:
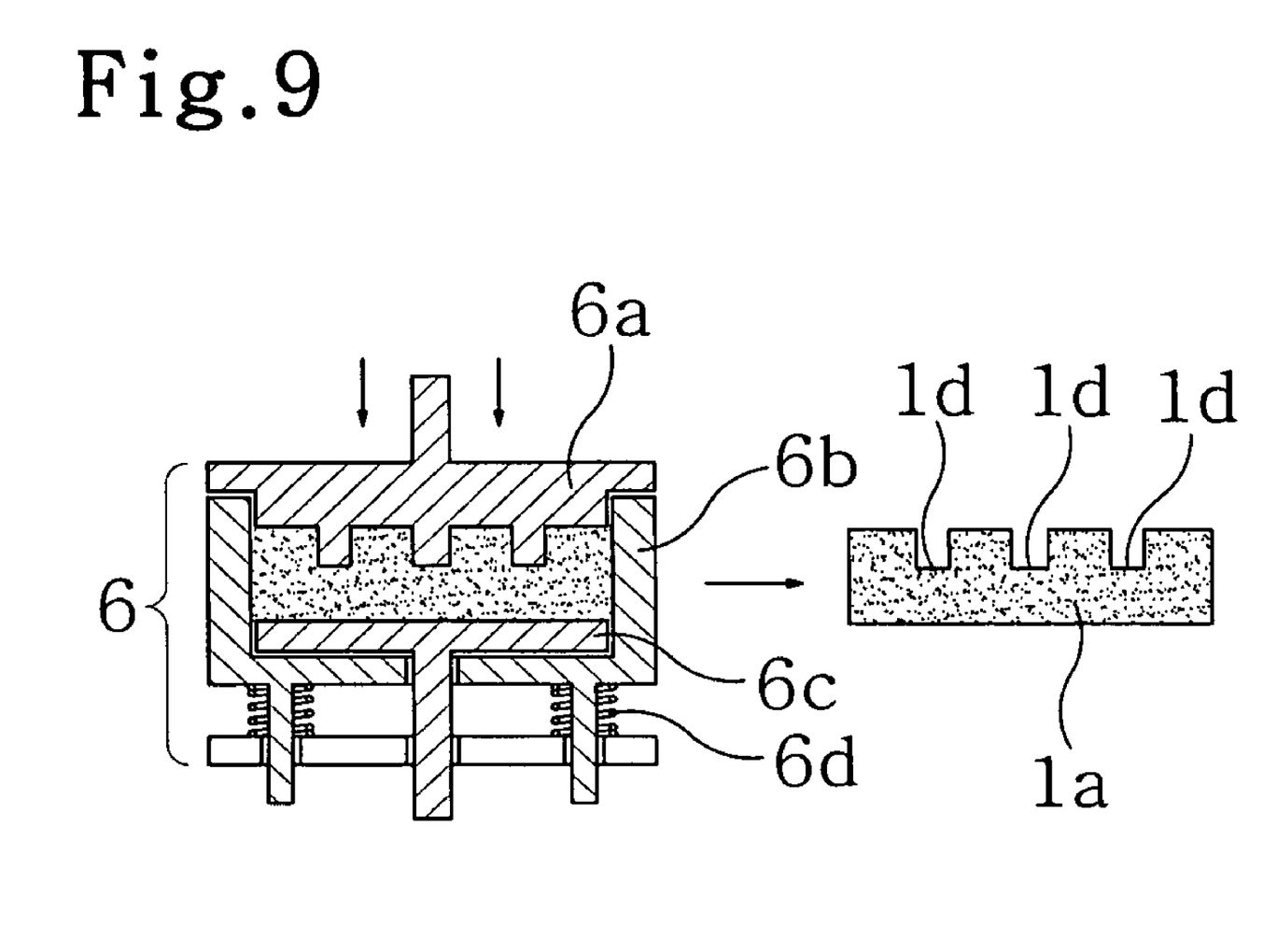
FIG. 9 is an explanatory view illustrating a method for manufacturing a screen material using a mechanical press.

More specifically, in the above-described manufacturing method, as shown in FIG. 9, the mold 6 includes a surface mold 6a having a lower surface engraved with a surface pattern of the screen 1, an outer mold 6b in which the screen material 1a is received, and a bottom mold 6c which is located at the bottom of the outer mold 6b to support the screen material 1a. In a state wherein a dough, obtained by appropriately mixing white pigments, glass-beads, silica, aluminum powder, or mixtures thereof, into the inorganic material such as clay, feldspar, silica stone, pottery stone, or the like, is received in the outer mold 6b, the dough is compressed by the surface mold 6a via operation of a mechanical press, etc. At this time, as the dough is firmly compressed and molded under the assistance of an elastic force of springs 6d provided at a lower end of the outer mold 6b, the grooves 1d for insertion of the soft material 1b can be formed at a surface of the dough.

The molded constituent material of the screen 1 is thermally hardened to obtain a form as shown in FIG. 4. Subsequently, to form the soft material 1b in the grooves 1d, urethane resin, liquid-phase rubber, or the like is inserted into and hardened in the grooves 1d.

In particular, the above-described manufacturing method of the screen 1 is advantageous to manufacture a thin-film screen in which the thickness 1c of the screen is less than 5 mm. In this case, an appropriate depth of the grooves 1d for formation of the soft material 1b is about 3 mm.

That is, the configuration of FIG. 4 is advantageous for a thin configuration of less than 5 mm in thickness.

Figure 5:
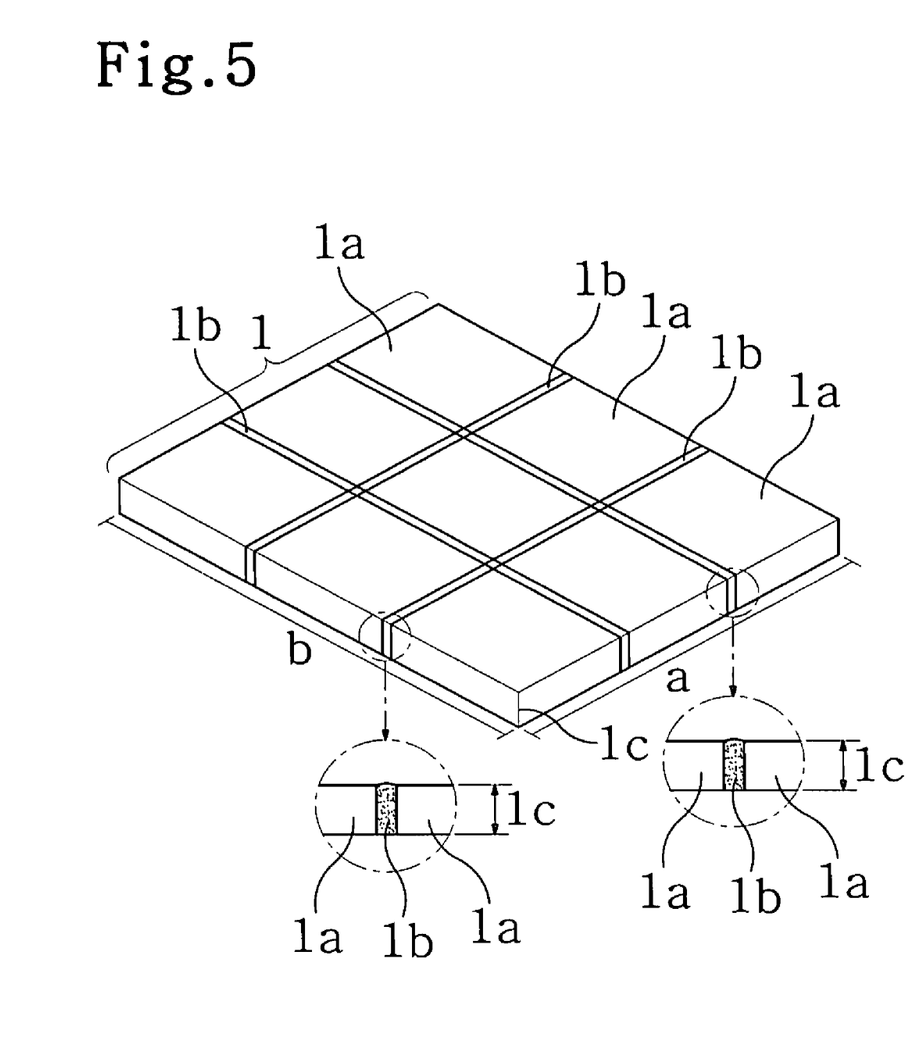
FIG. 5 is an explanatory view of a screen according to an alternative embodiment of the present invention, which has a block pattern.

Alternatively, as shown in FIG. 5, the screen 1 may be formed by appropriately mixing white pigments, glass-beads, silica, aluminum powder, or mixtures thereof, into an inorganic material such as clay, feldspar, silica stone, pottery stone, or the like, molding the mixture into rectangular blocks or other desired shapes of blocks, thermally hardening the blocks, and injecting a soft material such as urethane, rubber, non-woven fabric, or the like between the blocks.

In this alternative embodiment, the tape-shaped soft material 1b can be provided at both surfaces thereof with an adhesive, to allow the blocks to be bonded to one another in vertical and horizontal directions.

Although the above-described alternative embodiment has no specific limit in size and shape, preferably, the screen material 1a may take the form of a block having a size of 10 mm×10 mm, or may take the form of a bar having a width of 10 mm, and the block or the tape may have a thickness of 5 mm. Also, preferably, the soft material 1b has a width of 1 mm and the same thickness as that of the screen material 1a.

The surface of the screen 1, manufactured by the above-described first, second, or third embodiment, may be formed by grinding a surface of the completely hardened screen material 1a to have a particle size of 40 mesh to 800 mesh, or may be formed by stacking the screen material 1a on a substrate which was previously formed with a ground surface of 40 mesh to 800 mesh.

The white cement screen material 1 provides an irregular surface to the screen 1 after hardening. Therefore, to achieve a desired planarity, the irregular surface of the screen 1 must be ground to have a particle size of 40 mesh to 800 mesh. However, if the screen surface is ground to 800 or more mesh, it suffers from a hot-spot phenomenon wherein an excessive amount of light is reflected and concentrated at one spot.

The glass-beads, silica, titanium, aluminum powder, or mixtures thereof, is mixed with the white cement or plastic resin, to have a particle size of 40 mesh to 800 mesh.

With the above-described configuration, even if the surface of the screen 1 is worn, the surface can maintain a uniform particle size, and achieve excellent diffusion and imaging effects. Accordingly, forming the screen 1 using the white cement, clay, or the like is possible.

The screen material 1a of the above-described first to third embodiments can be selected from white cement, a pigment mixture obtained by mixing a variety of pigments with white cement, a light diffuser mixture obtained by mixing a single light diffuser or an appropriate mixture of plural light diffusers, with white cement, and the like.

Alternatively, the screen material 1a can be prepared by mixing white cement, a variety of pigments, a variety of light diffusers, etc., with plastic resin such as homica and epoxy resin.

The anti-skid soft material 1b can be selected from known anti-skid materials such as urethane, rubber, non-woven fabric, calcium material, and the like.

Figure 6:
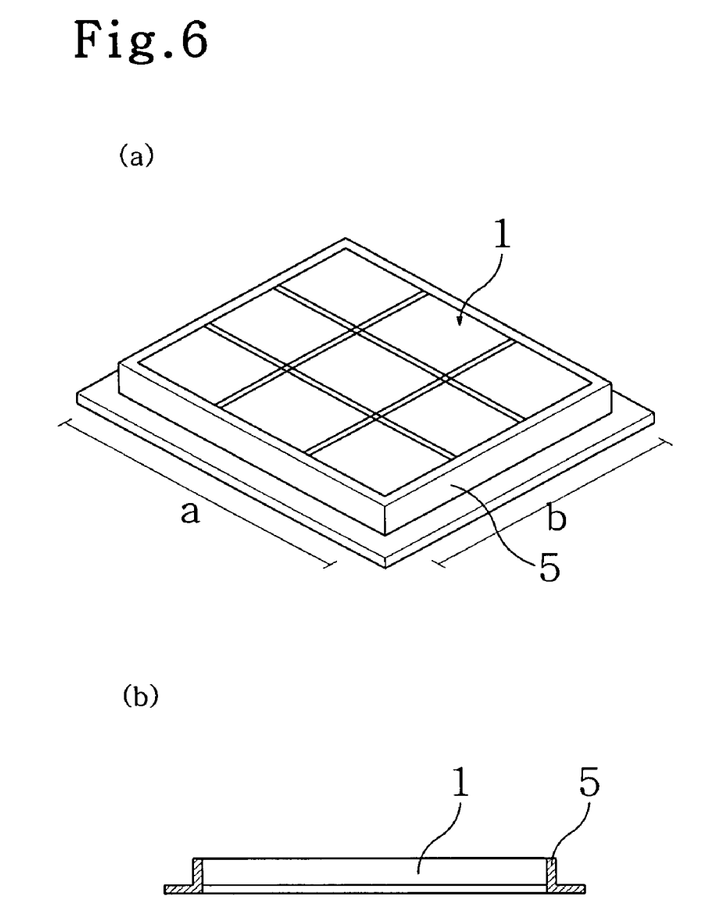
FIG. 6 is an explanatory view of a screen protective rim.

The above-described screen 1 has a risk of wear or breakage at corners thereof. Therefore, it is preferred that a metal protective rim 5 be formed along a periphery of the screen 6 as shown in FIG. 6.

Note that the dimensions described in the above embodiments can be increased or decreased in consideration of the size of the screen 1 or the installation place of the screen 1.

For example, when the screen 1 takes the form of a block as shown in FIG. 5, it is preferred that the screen 1 have the same thickness as that of surrounding pavement blocks or tiles, in view of durability.

Accordingly, the thickness of the screen 1 can be in a range of 5 mm to 100 mm.

The screen 1 is constructed in such a way that the soft material 1b and the screen material 1a are mixed in an appropriate ratio. With this configuration, the surface of the screen material 1a can reflect and diffuse an image from a projector 4 installed at the ceiling, and the soft material 1b has an anti-skid frictional surface and can prevent slip and falls of pedestrians even if moisture or impurities are present on the road.

In addition, when viewed in the depth direction of the screen 1, the soft material 1b and the screen material 1a define a constant texture pattern in the thickness 1c of the screen 1. Therefore, even if the surface of the screen 1 is worn by a frictional force or upon cleaning, or the like, the screen material 1a and the soft material 1b can maintain a constant surface shape.

Accordingly, the white screen material 1a can provide a vivid image, and the soft material 1b can achieve an anti-skid function.

As apparent from the above description, the present invention provides a floor projection screen, which can achieve a high rigidity, vivid imaging, and an anti-skid function for pedestrians. Even if the screen is worn by a frictional force caused by cleaning or pedestrian walking, the screen can maintain an original shape and function thereof. In addition, the screen exhibits excellent resistance for thermal expansion/contraction due to temperature variation. Accordingly, the floor projection screen of the present invention is a very practical floor screen to be installed in front of department stores, shops, shopping malls, and at stairs, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A floor projection screen comprising:
   a first material constituting a screen material; and
   a second material having anti-skid properties;
   said first material being hard and said second material being softer than the first material; and
   wherein the first material and the second material are mixed with each other in an appropriate area ratio, to provide the screen with a high rigidity and an anti-skid function.

2. The floor projection screen according to claim 1, wherein a reflective material is mixed with the screen material.

3. The floor projection screen according to claim 1, wherein a light diffuser material is mixed with the screen material.

4. The floor projection screen according to claim 1, including an additive added into a surface of the screen material, the additive having a particle size of 400 mesh to 800 mesh.

5. The floor projection screen according to claim 1, wherein each of the second soft material and the first screen material has the same thickness as a total thickness of the screen.

* * * * *